United States Patent [19]
McGhie et al.

[11] Patent Number: 4,943,078
[45] Date of Patent: Jul. 24, 1990

[54] HEAVY DUTY TRANSPORT VEHICLE

[76] Inventors: James R. McGhie, 2970 S. Lexington, St. Paul, Minn. 55121; Robert D. Dieleman, 6109 S. Industrial Rd., Las Vegas, Nev. 89118

[21] Appl. No.: 187,557

[22] Filed: Apr. 28, 1988

[51] Int. Cl.$^5$ ............................................. B62D 53/08
[52] U.S. Cl. .................... 280/408; 280/419; 280/425.2; 280/426; 280/405.1
[58] Field of Search ............... 280/408, 410, 411 C, 280/419, 423 A, 423 B, 425 A, 426, 442, 445, 405 R, 404; 105/82, 164, 194, 195, 209

[56] References Cited

U.S. PATENT DOCUMENTS

| | | | |
|---|---|---|---|
| 2,687,225 | 8/1954 | Martin | 280/425 A X |
| 2,759,737 | 8/1956 | Manning | 280/423 B X |
| 2,907,576 | 10/1959 | Hutchens | 280/426 X |
| 3,438,652 | 4/1969 | Hoffacker | 280/423 A |
| 3,439,630 | 4/1969 | Cope | 105/195 X |
| 3,450,283 | 6/1969 | Helland | 280/425 A X |
| 4,111,451 | 9/1978 | Pinto | 280/474 X |
| 4,262,923 | 4/1981 | Weir | 280/423 B |
| 4,441,730 | 4/1984 | Damm | 280/442 X |

FOREIGN PATENT DOCUMENTS

| | | | |
|---|---|---|---|
| 0043628 | 1/1982 | European Pat. Off. | 280/423 A |
| 54-27115 | 3/1979 | Japan | 105/194 |
| 1293062 | 2/1987 | U.S.S.R. | 280/419 |

*Primary Examiner*—Charles A. Marmor
*Assistant Examiner*—Richard Camby
*Attorney, Agent, or Firm*—Harold D. Jastram; Robert A. Elwell

[57] ABSTRACT

A heavy load hauler for travelling on conventional road ways to move, for example heavy construction equipment such as cranes or the like from one work site to another. The hauler includes a front tractor drawn carriage, a rear carriage and a load unit disposed between and carried by such carriages. The front carriage is supported upon a multiplicity of independent wheel and axis units. There is a first fifth wheel coupling at the leading end of the front carriage, for connecting to the fifth wheel coupling of a tractor, and a second fifth wheel coupling spaced rearwardly therefrom. The load carrying rear carriage is also supported upon a multiplicity of independent wheel and axle units and there is a fifth wheel coupling intermediate the leading and trailing ends of such carriage. The load unit has detachably connected thereto a forwardly projecting and a rearwardly projecting pair of goosenecks and each has a fifth wheel coupling with the one on the forwardly projecting gooseneck connected to the fifth wheel coupling on the front carriage and the other to the fifth wheel coupling on the rear carriage. The load unit may be either the crane itself or a flatbed upon which the crane is carried. At least some of the independent wheel and axis units are steeraly mounted on the carriage associated therewith. The independent wheel and axis unit has the wheels thereof supported by a hydraulic suspension and included is hydraulic circuitry that interconnects all of the suspensions so as to distribute equally the load among all of the wheel units. Steering of the independent wheel and axle units is interphased for the front and rear carriages by a pair of operatively associated inter-related in-line valve cylinder units.

13 Claims, 10 Drawing Sheets

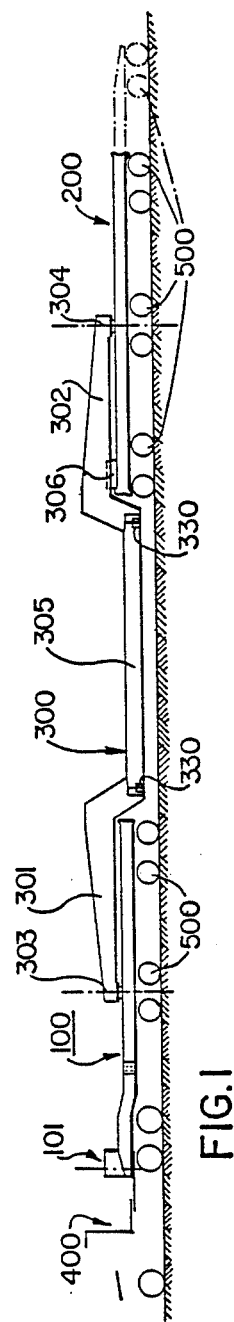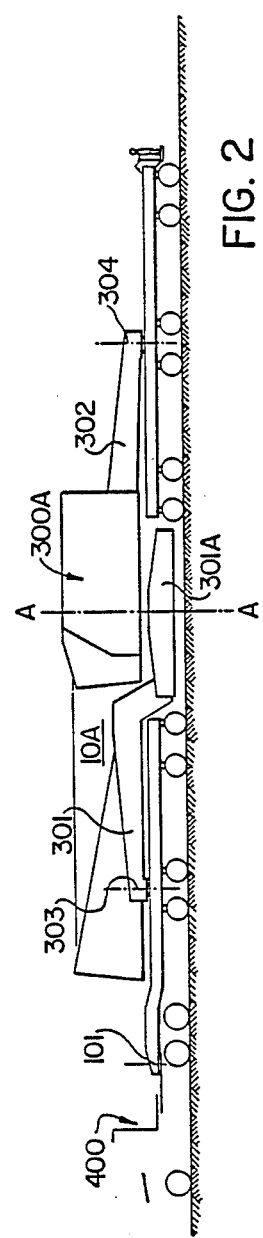

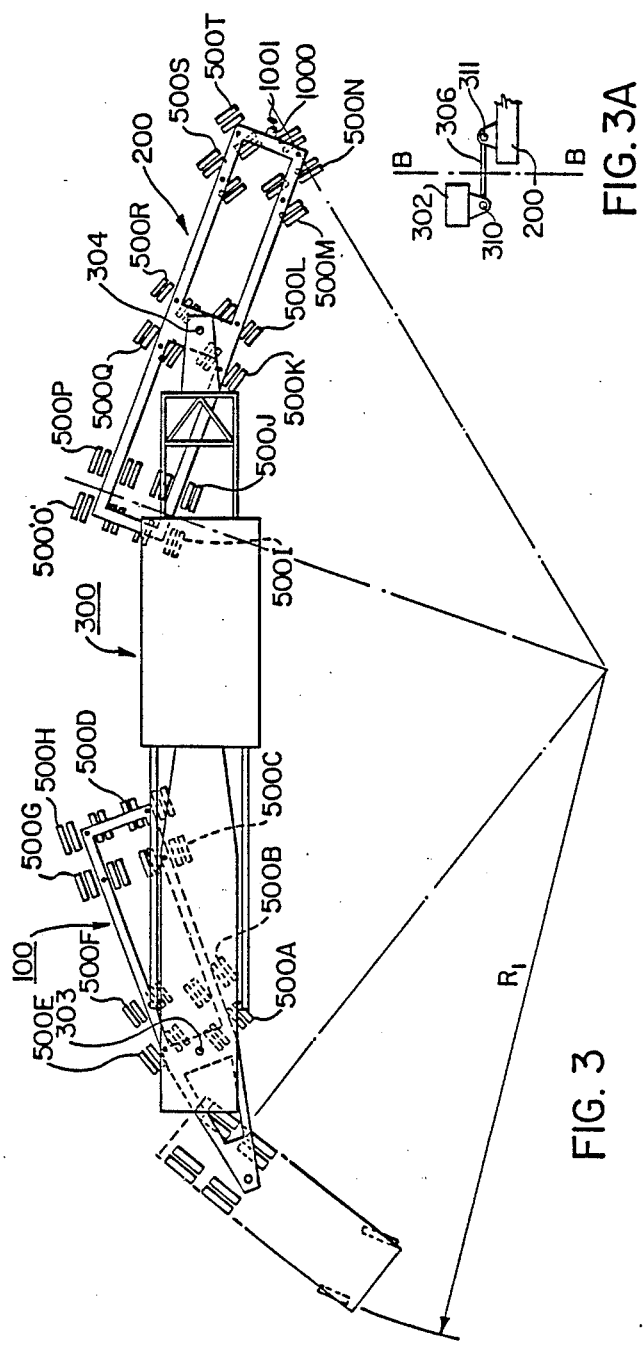

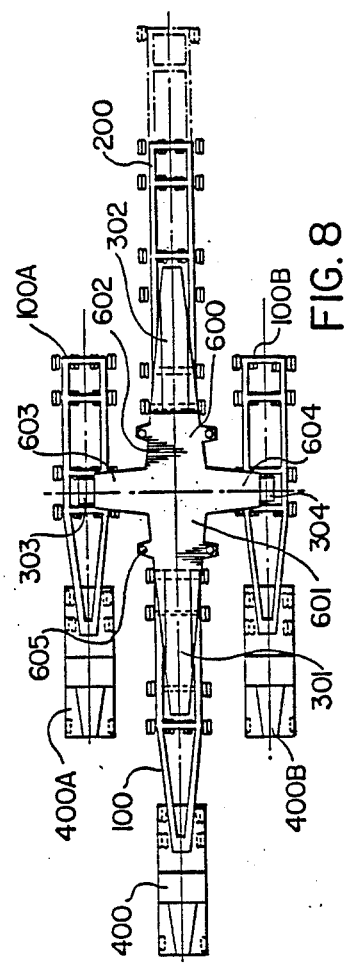
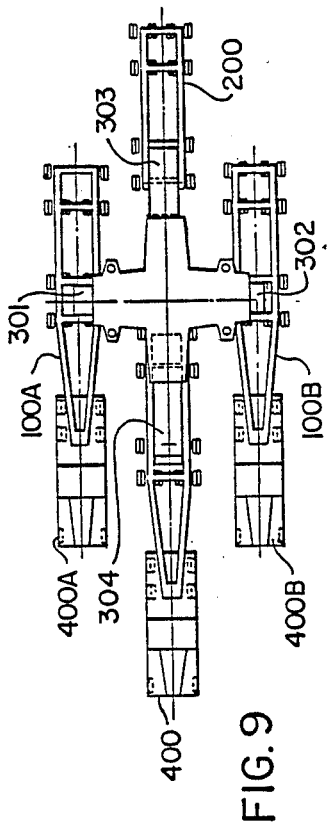
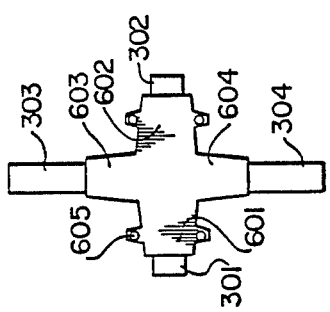
FIG. 8
FIG. 9
FIG. 7

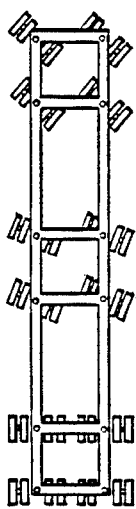
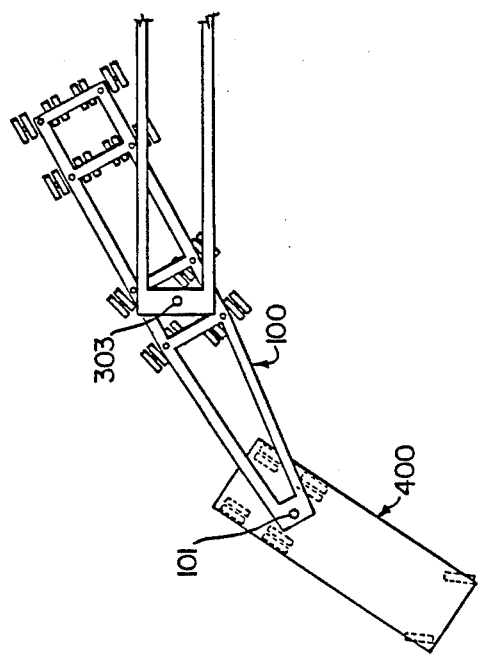
FIG.12

HEAVY DUTY TRANSPORT VEHICLE

FIELD OF INVENTION

This invention relates generally to multi-axle transport haulers for moving heavy loads such as cranes, construction equipment and materials used in construction from one location to another.

BACKGROUND OF INVENTION

Multi-axle semi-trailer type transport vehicles, to which the present invention relates, are generally known as exemplified by the teachings of J.A. Ranta U.S. Pat. No. 2,819,911 issued Jan. 14, 1958 and J. Perrotin U.S. Pat. No. 3,903,979 issued Sept. 9, 1975. Other patents to which reference may be had are as follows: U.S. Pat. Nos. 2,968,495 issued Jan. 17, 1961; 3,689,107 issued Sept. 5, 1972; 3,690,698 issued Sept. 12, 1972; 3,734,538 issued May 22, 1973; 3,930,669 issued Jan. 6, 1976; 4,165,005 issued Aug. 21, 1979 and 4,468,047 issued Aug. 28, 1984.

The present invention is directed particularly to an improvement over the latter U.S. Pat. No. 4,468,047 and results from adapting such disclosed apparatus for transport of substantially heavier loads. The apparatus of the present invention is intended for carrying payloads of up to say 1 M lbs., which as a rolling load, is difficult to design because of municipal, provincial and/or state laws regarding permitted loads on public road ways and highways.

One of the many difficulties in multi-axle, multi-wheel transport systems is distribution of the load evenly amongst the many wheels and one of the objects of the present invention is to provide an apparatus that generally overcomes such difficulty.

A further difficulty of multi-axle, multi-wheel vehicles is that they become rather lengthy rending them difficult to maneuver on public roads designed for more conventional transport systems and an object of the present invention is to provide, in addition to equal distribution of weight from one wheel system to another, means to steer the system and also controllably distribute the load.

In travelling, for example, from one place to another, it is desirable to have a soft ride so as not to impose undue impact by the rolling loads on the road carrying surface and/or the apparatus rolling on said surface and this soft ride can be provided in a lengthwise direction, but on the other hand it is desirable to have a stiff ride in the direction transverse to the travel direction so as to give stability to the travelling load. Another object of the present invention is to provide a multi-axle, multi-wheel transport vehicle with controllable ride characteristics.

SUMMARY OF INVENTION

One aspect of the present invention relates to equalizing loading on the plurality of wheel sets and to do so there is employed a hydraulic system. Prior art hydraulic wheel supports will be found in the aforementioned U.S. Pat. Nos. 4,468,047 and 3,903,979 as well as the following U.S. Pat. Nos. 2,812,193 issued to W. E. Grace Nov. 5, 1957; 3,014,739 issued to R. H. Kress Dec. 26, 1961; 4,186,814 issued to C. P. Heart Feb. 5, 1980; 4,453,734 issued to J. McGhie et al June 12, 1984; and 4,460,194 issued to J. McGhie et al July 17, 1984.

Another aspect of the present invention concerns distributing loads equally to a plurality of wheel sets where such wheel sets are arranged on two or more carriages and without the use of the multiplicity of goosenecks attached one on to the other, i.e. multiple load transfer points to obtain suspension equalization, as has been the case with prior art devices.

Another aspect of the present invention concerns a steering control system for a multiplicity of wheel sets under a train of chassis pivotly connected to form a vehicle with a multiplicity of articulated joints.

Articulated train type vehicles are known as exemplified by some of the foregoing patents, some of which also disclose steering means. In addition to the foregoing, reference may be had to the following patents that teach controlled steering on trailer type vehicles: USSR Patent No. 270,515 published May 8, 1970; U.S. Pat. Nos. 2,925,285 issued Feb. 16, 1980 to H. A. Haas; 2,959,428 issued Nov. 8, 1960 to J. P. Felburn; 2,968,495 issued Jan. 17, 1961 to C. T. Hutchens; 3,195,922 issued July 20, 1965 to C. E. Humes; 3,322,439 issued May 30, 1967 to C. F. Lemmon; 3,448,999 issued June 10, 1969 to M. M. Kollander et al; 3,533,644 issued Oct. 13, 1970 to C. E. Humes; 3,591,203, 3,689,107 issued Sept. 5, 1972 to C. E. Humes; 3,690,698 issued Sept. 12, 1972 to C. E. Humes; 3,712,641 issued Jan. 23, 1973 to Donald W. Sherman; 3,734,538 issued May 22, 1973 to C. E. Humes; 3,930,669 issued Jan. 6, 1976 to M. M. Kollander; and 4,244,596 issued Jan. 13, 1981 to T. Lee Chung.

A hydraulic steerable axle assembly is disclosed in the aforementioned U.S. Pat. No. 4,453,734. In a train type vehicle of the present invention one important aspect is the ability of the rear end to steer in phase with the front end. The axle suspension cylinders are used not only for steering, but also for raising and lowering the load without requiring any additional hoisting mechanism. This ability to raise and lower also facilitates connection of the goosenecks as will become apparent hereinafter.

One of the problems in heavy load hauling is knowing the weight and center of gravity of the load on each multi-axle grouping. With the hydraulic suspension this can be read and determined from direct reading of suspension pressure load gauges provided on an instrument panel. Not only can there be a direct read out of load but also distribution.

The axles being steerable and with the rear end steering in phase with the front, the turning radius is much better than competitive machines. Also since the axles have their own suspension, they can be added easily to give the hauler increased capacity as may be required.

In accordance with one aspect of the present invention there is provided a heavy load hauler for travelling on conventional road ways to move, for example heavy construction equipment such as cranes or the like from one work site to another, said hauler comprising a front carriage supported on a multiplicity of independent wheel and axle units, a first fifth wheel coupling at the leading end of such front carriage for connecting to the fifth wheel coupling of a tractor; a load carrying rear carriage supported on a multiplicity of independent wheel and axle units; and a load unit having detachably connected thereto a forwardly projecting and a rearwardly projecting pair of goose necks, each said goose neck having a fifth wheel coupling; the fifth wheel of the forwardly projected gooseneck being connected to a second fifth wheel coupling on said front carriage and the fifth wheel coupling on rearwardly projecting gooseneck being connected to a third fifth wheel coupling on said rear carriage and in the vicinity of the center thereof.

LIST OF DRAWINGS

The invention is illustrated by way of example in the accompanying drawings wherein:

FIG. 1 is a side elevational view of a heavy load hauler of the present invention;

FIG. 2 is a side elevational view, similar to FIG. 1, illustrating a minor variation to the load carrying portion of the hauler;

FIG. 3 is a top plan view of the load hauler of FIG. 1; FIG. 3A is a partial view taken transversely to the direction of travel of the vehicle and illustrates a lock bar for the rear wheel supported carriage;

Figure 4A:
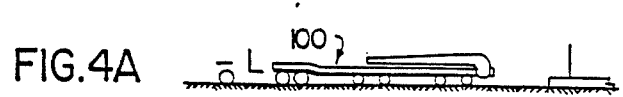
Figure 4B:
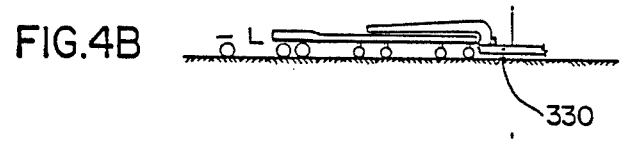
Figure 4C:
Figure 4D:
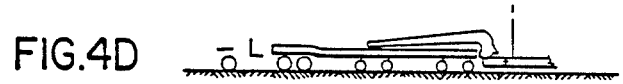
Figure 5:
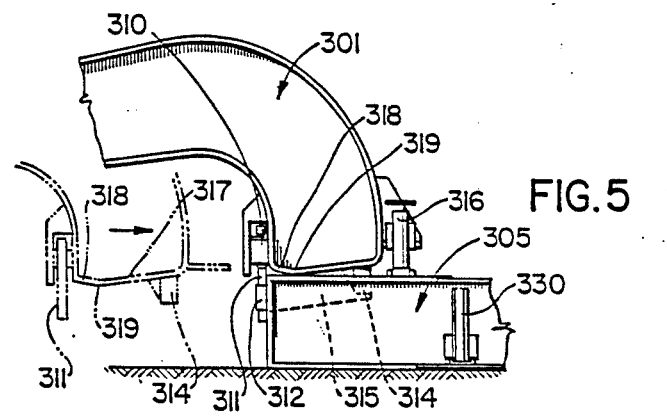
Figure 6:
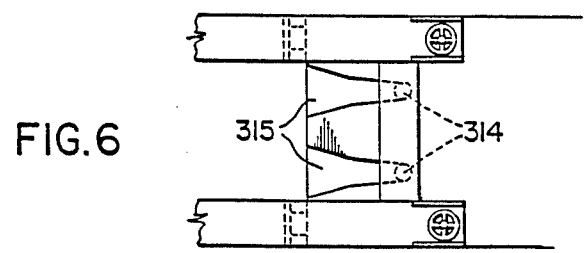
Figure 10:
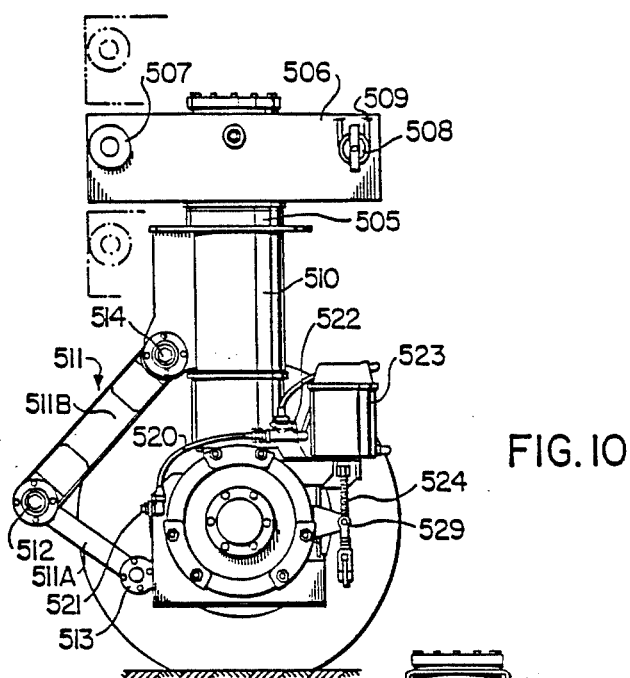
Figure 11:
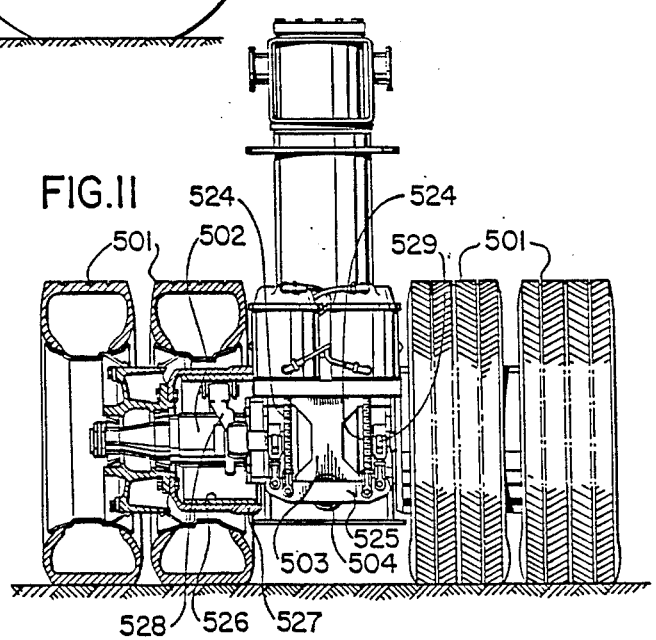
Figure 12A:
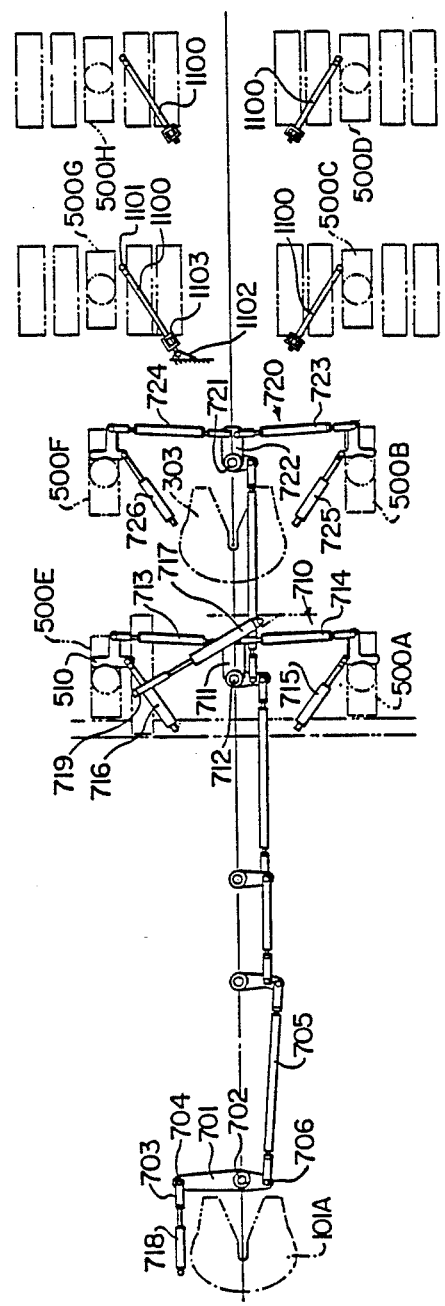
Figure 12B:
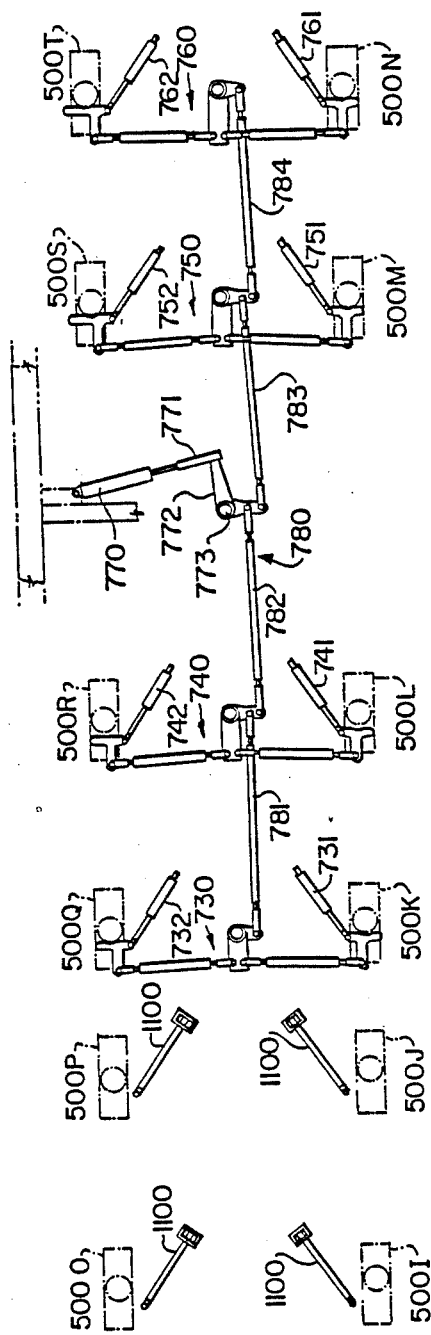
Figure 13:
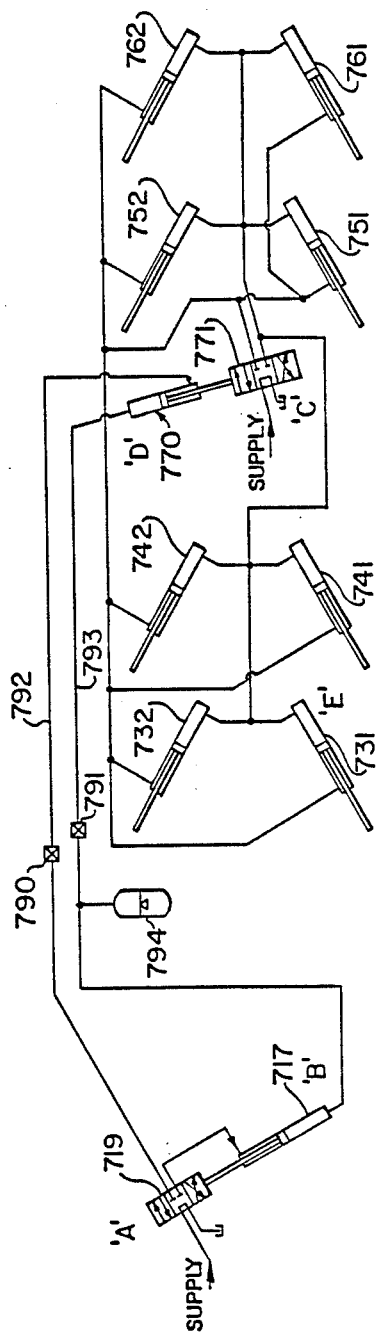
Figure 14:
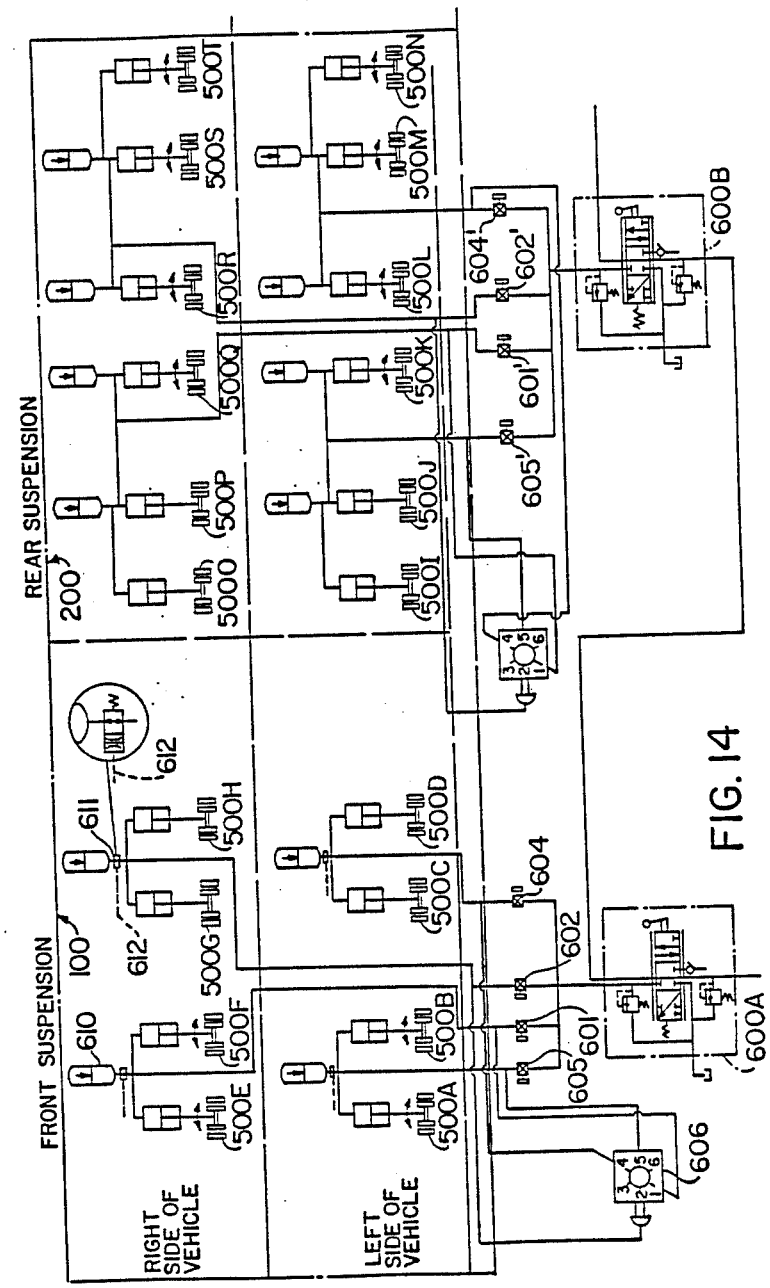

FIGS. 4A–4D is a diagrammatic partial side elevational view illustrating in sequence steps in the hook-up of the gooseneck to the load carrying bed with FIG. 4A depicting bringing the gooseneck to the load carrying bed; FIG. 4B depicts connection of the gooseneck to the bed and raising of the carriage frame; FIG. 4C depicts lowering the carriage frame while the load carrying platform is supported on jacks; and FIG. 4D depicts the gooseneck when attached to the load carrying bed in the hauler travel state;

FIG. 5 is a partial side elevational view of the gooseneck attachment to the load bed;

FIG. 6 is a partial top plan view of FIG. 5;

FIG. 7 is a top plan view of a center cross used to interconnect a number of wheeled carriage units;

FIG. 8 is a top plan view showing an arrangement with the unit of FIG. 7 having a series of wheeled carriage units mounted for travel in one direction;

FIG. 9 is a top plan view illustrating travel in a direction 90° to that illustrated in FIG. 8;

FIG. 10 is a side elevational view of one wheel suspension and axle unit;

FIG. 11 is a rear elevational view of the unit of FIG. 10;

FIG. 12 is a top plan diagrammatic view of a vehicle illustrated in FIGS. 1 and 3, but with reference to the steering system; FIG. 12A is a top plan view illustrating the linkage and hydraulic mechanisms for the front steering system so designated in FIG. 12; FIG. 12B is similar to FIG. 12A, but is the rear steering system so designated in FIG. 12 for the rear carriage unit;

FIG. 13 is a schematic for the hydraulics of the phased power steering system inter-relating and intergrating the front and rear steering;

FIG. 14 is a schematic of the hydraulics of the suspension.

DETAILED DESCRIPTION OF PREFERRED EMBODIMENTS

Referring to FIGS. 1 to 3 there is illustrated a heavy load hauler consisting of a front multi-axle, multi-wheel carrier unit 100, a rear multi-wheeled, multi-axle carrier unit 200 and a center load carrying unit 300. The latter load carrying unit has a forwardly projecting gooseneck 301 and a rearwardly projecting gooseneck 302 pivotly coupled by respecting fifth wheels 303 and 304 to the front and rear wheeled units 100 and 200. The load carrying unit 300 has a load or flat bed portion 305 in the embodiment illustrated in FIG. 1 and on which the load to be carried is placed. In the embodiment illustrated in FIG. 2 the center load unit is the actual crane itself with respective goosenecks 301 and 302 detachably connected thereto. The crane unit 300A in FIG. 2 consists of a wheeled or tracked under carriage portion 301A and a crane mounting platform 302A pivotly attached thereto for slewing about a vertical axis A—A. The goosenecks 301 and 302 are connected respectively to the under carriage 301A and the platform 302A. The embodiment of FIG. 2 illustrates use of the object being carried as part of the carrying vehicle during transport from one location to another and differs from the embodiment of FIG. 1 where the transport vehicle is complete in itself. Obviously the payload for the embodiment of FIG. 1 is substantially less than that for the FIG. 2 embodiment considering all other things being equal i.e. number of wheels, axles, tire size, etc.

The front carrier unit 100 is connected by a fifth wheel 101 to a tractor unit 400. The tractor 400, the wheeled carriage 100, the load carrying unit 300 and the trailing wheeled carrier unit 200 is a vehicle train with articulated joints at the fifth wheels 101, 303 and 304. In addition to the articulated joints, at least some of the wheeled axle units are steerable as will be described more fully hereinafter. The three fifth wheel pivot joints, designated respectively 101, 303 and 304, all have a vertical pivot axis as do some of the wheeled units i.e. those which are steerable. The vehicle illustrated in FIG. 3 has, for example, an approximate length of 130 feet with a design turning radius designated R1 of 70 feet. Turning of the wheels i.e. steering of the wheels on the rear carriage unit 200 can be operator controlled for maneuvering on the site or alternatively steering is automatic through a hydraulic system to be described hereinafter when travelling along a road in moving from one location to another. In the latter travelling state the rear carriage 200 is locked so as to prevent pivoting about the fifth wheel 304 by a tie rod or lock bar 306 pivotly connected respectively at opposite ends by pivot pins 310 and 311 to the gooseneck 302 and the rear carriage unit 200. The general location of the tie rod 306 is shown in FIG. 1 near the forward end of the rear wheeled carriage unit 200.

Each of the front and rear wheeled carriages 100 and 200 have a multiplicity of independently mounted wheel axle units 500 that support the carriage. The front carriage 100, illustrated in FIG. 3, has independent wheel axle units designated 500A, 500B, 500C, 500D, 500E, 500F, 500G and 500H. Similarly the rear carriage 200 has independently mounted wheel axle units 500I through to 500T. Each wheel axle unit 500A through to 500T consists of four, rubber tired, axle mounted wheels on the lower end of a hydraulic piston cylinder unit that has means on the upper end for attachment to the frame of the carriage. At least some of the wheel axles are mounted in such manner that they can pivot about a vertical axis and through suitable linkage mechanisms are controllably steered as will become more apparent hereinafter.

The individual hydraulic suspension wheel axle units 500A to 500T are of the general type disclosed in the aforementioned U.S. Pat. Nos. 4,453,734; 4,460,194 and 4,468,047. Controlled steering of steerable wheels by way of a fifth wheel coupling of the carriage to the tractor is also disclosed in U.S. Pat. No. 4,468,047. A fifth wheel coupling for carriage 100 to the tractor i.e. the fifth wheel designated 101 is also disclosed in these U.S. patents and wherein James R. McGhie is co-inventor.

The individual wheel units of the present apparatus are illustrated in respective side elevational view and rear elevational view in FIGS. 10 and 11. Referring to these figures, each wheel axle unit 500 has four pneumatic tired wheels 501 mounted on an axle 502 which is pivotly attached to the piston rod 503 of the hydraulic cylinder unit by a pivot pin 504. The pivot axis of pivot pin 504 is length-wise of the vehicle permitting the wheel unit to follow changes in lateral slope or crowning of the road surface. The piston rod 503 is connected to a piston, not shown, reciprocally mounted in a cylinder 505 that projects downwardly from and rigidly attached to a frame mounting rigid unit 506. This frame mounting unit 506 has a pair of front pins 507 projecting laterally therefrom and a pair of rear pins 508. These pins can fit into appropriate saddles facing downwardly on the carriage frame and locked in position on such saddles by, for example, U-bolts one of which is illustrated in FIG. 10 and designated 509.

The steerable wheel units have the axle frame portion connected to a collar 510 that is pivotally mounted on the outer surface of the cylinder 505 such connection being by way of an articulated linkage 511. The linkage 511 has members 511A and 511B pivotally interconnected by a pin 512. Link 511A is pivotally connected to the frame of the axle unit by a pivot pin 513 and link 511B is pivotally connected by pivot pin 514 to the collar 510. Steering of the wheel unit is effected by pivoting the wheel axle about the longitudinal axis of cylinder 505 i.e. a vertical axis and a mechanism along with suitable linkages to effect such steering will be described hereinafter.

Each independent mounted wheel axle unit 500 is provided with an air brake system and has mounted on the wheel axle unit an air pressure conduit 520 that may be connected to a suitable air pressure supply by way of a coupling 521. Braking is controlled through a valve mechanism 522 with air chambers 523 being provided to effect movement of a pair of brake rods 524. The brake rods 524 are connected to an equalizing arm 525 that is mounted to brake slack adjusters 529 at each end of arm. Brake shoes 526 within a brake drum 527 are actuated by a cam type brake actuating arm 528. A slack adjuster 529 is provided for variously and appropriately setting the brake shoe.

One important aspect of applicant's invention is the provision of equal distribution of weight to the various individual wheel axle units so that each carries an equal share and thus insure there is no overloading on the road surface. This equal distribution of weight is effected by hydraulically interconnecting all of the piston cylinder units. The hydraulic circuitry for the suspension of the vehicle illustrated in FIG. 1 is shown in FIG. 14 wherein by broken line the wheel carrier unit 100 is on the left and the rear carrier unit 200 is on the right. The suspension units 500E to 500H on the front carriage and suspension units 500(O) to 500T on the rear carriage 200 are on the right hand portion of the vehicle which in FIG. 14 is separated from the left hand side of the vehicle by a broken line designated BL. The respective left and right hand side of the vehicle are so above and below such broken line. The raise and lower valve 600A for the front suspension controls the fluid to and from the cylinders as shown in the schematic through the respective gate valves 601, 602, 604 and 605. A pressure gauge 606 provides a direct pressure reading for the systems 1, 2, 4 and 5 of the front carriage 100. Similarly in the rear carriage 200 raise and lower valve 600B controls the systems designated 1, 2, 4 and 5 for the rear carriage through the gate valves 601', 602', 604' and 605'.

To charge the front and rear systems gate valves 601, 602, 604 and 605 are opened and the respective valves 600A and 600B actuated to appropriately position the height of the carriage. It should be noted at this point, all four systems are interconnected and thus all have the same pressure. Systems 1, 2, 4 or 5 can be operated independently by closing the other valves and actuating the raise lower valve associated therewith. When independent adjustment is complete, all valves 601, 602, 604 and 605 are opened to insure pressure equalization and then closed. With the gate valves closed, all four systems have independent equalized suspension points. The hydraulic support system is also associated with an oil nitrogen accumulator 610 for absorbing shock loads and nitrogen pressurization can be varied. Valve 611 controllably stiffens the suspension (by air pilot line 612) to avoid front carriage dipping from braking deceleration. Control of fluid to and from the hydraulic cylinders is used to raise and lower the wheeled units and also which allows for running at various heights. Carriages 100 and 200 are provided with respective height regulating valves 600A and 600B carried on the frame and exposed on one side for easy access. One of the problems in heavy load hauling is knowing the weight and center of gravity of the load being hauled. With the hydraulic suspension, one can tell the loading on each axle and also each axle grouping by appropriately located direct read-out pressure gauges. The hydraulic suspension and the independent wheel axle unit i.e. each having their own suspension, permits adding or taking away axles as may be required for the capacity of the hauler unit.

Another feature of the present invention is the detachably mounted goosenecks which in one embodiment i.e. FIG. 1, is attached to the load carrying bed and in the other embodiment i.e. FIG. 2, is attached to the load itself. While a gooseneck can be attached in many different ways, a preferred attachment particularly for the embodiment of FIG. 1 is illustrated in FIGS. 4–6. Referring to these figures, FIG. 4 is a sequence of steps designated FIGS. 4A, 4B, 4C and 4D for attachment of the gooseneck to the load carrying bed. These steps show a system that accommodates the large deflection that takes place on a long beam like the gooseneck. The bed has to be passed from the ground to the 15" cruising travel position in two stages. Referring to FIG. 5, the portion of gooseneck 301 is illustrated in solid line attached to the forward end of the carrying bed 305 and in broken line the connecting end of the gooseneck is shown detached from and forwardly of the load carrying bed. The gooseneck 301 has a pair of laterally spaced, forwardly projecting pins 310 from which there depends respective ones of a pair of links 311. These links have an aperture adjacent the other end for receiving respective ones of a pair of pins 312 that are fastened to and project forwardly from the front edge of the load carrying bed 305. The gooseneck 301 has a further pair of downwardly projecting locate pins 314 laterally spaced apart from one another and which slide in respect of ones of guide slots 315 in the upper forward face of the load carrying bed. Attached to the gooseneck 301 is also a pair of screw or hydraulic jack units 316 that can be detachably connected to the load bed or project downwardly into suitable recesses in the bed surface. From FIG. 5 it will also be observed that the lower end of the gooseneck that contacts the load bed surface has a curved lower surface with a major portion designated 317 that slopes upwardly and rearwardly and a minor portion designated 318, that slopes upwardly and forwardly from a transition point 319. This transition point effectively is a fulcrum or pivot point for the gooseneck in attachment or engagement with the upper surface of the load bed 305.

Connection of the gooseneck to the load bed is diagrammatically illustrated in FIG. 4 wherein FIG. 4A shows the gooseneck 301 resting flat on the carriage 100. In this connecting position the suspension for the independent wheel units 500 of the wheel carriage 100 are in their fully retracted condition i.e. the carriage is fully lowered. The carriage 100 is backed into position as shown in FIG. 4B during which time the downwardly projecting guide pins 304 fit into the load bed slots 315 guiding the gooseneck into its position. Once the links 311 have engaged pins 312 and screw jack 316 has been lowered to contact bed, the suspension is raised to full height, for example in the instant case the preferred height is through use of 18" stroke cylinders. This raises the load bed off the ground 18" less the gooseneck deflection and in its raised state is supported by manually extending screw jacks 330 carried by the load bed. FIG. 4C illustrates the load bed 305 supported by the jacks and the suspension of the wheeled units 500 is again fully retracted i.e. the carriage lowered. This causes the gooseneck 301 to lower with the carriage 5th wheel and in so doing, pivots about the crest 319 leaving the gooseneck lower end 317 and screw jack 316 further above the surface of the load bed. In this state the screw jacks 316 are extended to pressural engagement with the load bed. The suspension of the wheeled units 500 is raised to the travel position. The jacks 330 have now been raised, as illustrated in FIG. 4D and the load bed 305 is in its raised load carrying and hauler travelling condition. The load of the load bed is transferred to the front and rear carriages by way of the respective front and rear goosenecks.

In FIGS. 7, 8 and 9 there is diagrammatically illustrated, in top plan view, a modified load carrying hauler provided in accordance with the present invention. The hauler of the type illustrated is for extremely heavy loads of say up to 1 M lbs. and consists generally of a load carrying bed 600 having a forwardly projecting leg 601, a rearwardly projecting leg 602 and a pair of laterally projecting legs designated respectively 603 and 604. Located one on each of opposite sides of each of the forwardly and rearwardly projecting legs 601 and 602 is a hydraulic outrigger 605. Sliding goosenecks, for example 301 and 302 project respectively forwardly and rearwardly of the vehicle and as illustrated in FIG. 8 the forward projecting gooseneck 301 is attached by a fifth wheel to a wheeled carriage 100 towed by a tractor 400. Similarly the rearwardly projecting gooseneck as in the FIG. 1 embodiment is supported by a wheeled rear carriage 200. In the embodiment illustrated in FIG. 8, the laterally projecting arms 603 and 604 are carried by retracted sliding goosenecks 303 and 304 attached to two further wheeled undercarriages designated respectively 100A and 100B, towed by respective tractors 400A and 400B.

The load carrier illustrated has a forward direction of travel to the left as viewed in FIG. 8. To move in a direction at right angles and where turning space would be a problem, set the hydraulic outriggers. At the respective fifth wheel connections disconnect carriages 100, 100A, 100B and 200. Using tractor 400 retract goosenecks 301 and 302 and extend goosenecks 303 and 304. Drive and connect carriage 100A to gooseneck 301, carriage 100B to gooseneck 302, carriage 100 to gooseneck 304 and carriage 200 to gooseneck 303. Retract the outriggers and vehicle is now ready to move at 90° to the original FIG. 8 direction.

As previously indicated, at least some of the independent wheel axle units are steerable and the system to accomplish the same is illustrated generally in FIG. 12 with FIGS. 12A and 12B illustrating more details of the system. FIG. 13 is a hydraulic schematic for the steering.

Referring to FIG. 12, there is illustrated a heavy load hauler of the type shown in FIGS. 1 and 3 having a first fifth wheel 101 attaching the carriage 100 to the tractor 400. A second fifth wheel 303 connects the gooseneck 301 of the load carrying platform to the front carriage 100 at a position spaced rearwardly from the first fifth wheel 101. The front steering system, as it will be referred to, is illustrated in FIG. 12A and concerns the portion of the vehicle having the first and second respective fifth wheels 101 and 303. The rear steering portion is with respect to the trailing wheeled carriage 200 which as in FIG. 1 supports the load carrying portion 300 through the fifth wheel connection to gooseneck 302, such connection and arrangement not being shown in FIG. 12. The rear steering portion is with respect to the steerable wheels of the wheeled carriage 200.

Referring to FIG. 12A, the first fifth wheel 101 is diagrammatically illustrated in broken line by the bed portion 101A carried by tractor 400 of the fifth wheel 101. The front steering system is associated with that fifth wheel and includes a lever arm 701 pivotly attached as by pivot pin 702 to the frame of the wheeled carriage 100. A connecting link 703, which is selectively adjustable in length, is pivotly attached as by pin 704 to the arm 701 and at the other end the hydraulic steering valve 718 is ball joint mounted to the frame of the tractor 400.

The linkage consisting of a series of link members 705 is connected as by a pin 706 to the lever 701 and at the other end to a first linkage system generally designated 710 for steering wheel units 500A and 500E, and by a second linkage generally designated 720 for steering steerable wheel units 500B and 500F. The mechanical linkage 710 includes a lever arm 711 pivotly mounted as at 712 and which is pivotly moved thereabout by movement of the linkage 705. The lever arm 711 has respective links 713 and 714 each connected at one end thereof thereto and other end of the respective links is connected to collars 510 of the respective wheel units 500A and 500E. Connected also to these collar units are hydraulic power assist cylinder units 715 and 716 which are operatively controlled by valve 718. Valve 718 is so mounted as to be actuated as the tractor turns about the 5th wheel system. The mechanical linkages shown keep the steering system 710 and 720 in phase with the tractor turn. The valve 718 hydraulically powers the wheel units to steer.

The linkage 720 similarly includes a lever arm 722 pivotly mounted as at 721 and which has one arm thereof attached to a link member of linkage 705. Another arm of the lever member 722 has connected thereto respective ones of a pair of variable length or adjustable length links 723 and 724 which are connected to the collars 510, by suitable means, of the respective steerable wheel axle units 500B and 500F. Power assist in the steering for these wheel units is provided by respective hydraulic cylinder units 725 and 726.

The rear steering system illustrated in FIG. 12B has linkage systems the same as 710 and 720, and these are designated in FIG. 12B generally by the reference numerals 730, 740, 750 and 760. The linkage system 730 steers wheel axle units 500K and 500Q, the linkage system 740 steers wheel axle units 500L and 500R, the linkage system 750 steers wheel axle units 500M and 500S, and the linkage system 760 steers wheel axle units 500N and 500T. The valve 719 and cylinder 717 operate in association with a second hydraulic cylinder 770 that phases the front and rear system. Associated with the hydraulic cylinder 770 is a valve 771 connected directly to the piston rod 772 of the piston cylinder unit 770. This is also the case with the valve 718 and cylinder 717. The valve 771 controls fluid supply to and from hydraulic steer cylinders 731, 732, 741, 742, 751, 752, 761 and 762, all of which is apparent from the schematic for the hydraulics illustrated in FIG. 13. The rear steering system of FIG. 12B is actuated and kept in phase by valve 719 and cylinder 717. If, however, the rear hydraulic valve 771 should fail valve 719 and hydraulic cylinder 717 will still operate the rear steering system through actuating the hydraulic cylinder 770 and having the system work manually.

The steerable wheel units, actuated by the respective linkages 730, 740, 750 and 760, are all intergrated and inter-related in their movement by a linkage system generally designated by reference numeral 780 and includes link arms 781, 782, 783 and 784. These link arms mechanically phase the steering of the rear group of wheels i.e. in this case eight units. The hydraulic cylinder 770 actuates this linkage through a lever arm 772 pivotly attached as by pivot pin 773 to the frame of the wheeled carriage. In FIG. 12B it will be observed link members 782 and 783 are connected to one of the arms of this lever arm 772. The hydraulic cylinder 770 is anchored as by a pivot pin 774 to the frame 250 of the wheeled rear carriage 200.

Each of the valves 771 and 719 are actuated by pressure applied to the piston rod of the cylinder unit to which it is attached.

Because the cylinder and valve unit 717, 719 is associated with the front carriage and the valve and cylinder unit 771, 770 is associated with the rear carriage, and such carriages may be separated from one another, quick disconnects 790 and 791 are provided in the respective hydraulic lines 792 and 793. An accumulator 794 of the nitrogen gas type is connected to the line 793.

Manual steering control overriding the phased system is provided at a control station designated 1000 at the trailing end of the trailing carriage where there is an operator 1001. While operating manually lockbar 306 (FIG. 3) is removed and valve 771 FIG. 12B is disconnected from lever 772. With these removed it allows carriage 200 to turn about fifth wheel 304 when the steering system in wheel units 500K, 500L, 500M, 500N, 500Q, 500R, 500S and 500T is actuated. This allows the vehicle to have a reduced normal steering radius or go into a crab steer condition where the whole vehicle would move in a side direction. In the manual mode the rear end turns independently from the front.

Not all of the wheels under the front and rear carriages are steerable. As illustrated in FIG. 12A the front carriage axle wheel units 500C, 500D, 500G and 500H are locked by respective ones of individual arms 1100. Each of the arms 1100 are connected at one end to the collar 510 of the wheel axle unit associated therewith and the other end as indicated at 1102 is connected to the frame of the carriage associated therewith. The link arm 1100 is provided with a variable length adjusting mechanism 1103.

In the steering system described in the foregoing valves 719 and 771 are each a four-way three position hydraulic mechanical steering valve. The valve is mounted into the mechanical steering system by way of a female thread at one end and a ball joint at the other. As the mechanical system starts to steer, the force activates the steering valve which in turn sends oil to the steering cylinders. Cylinders 717 and 770 are designed with multiple lips using seal combinations of glass reinforced hytrel and glass reinforced nylon to insure they are absolutely leak proof. The steering cylinders i.e. 731 and 732 are controlled by the cylinder 770. The cylinders 717 and 770 are connected for phase steering and as cylinder 770 is activated it in turn actuates valve 771 which sends the oil to the power steering cylinders. Should the hydraulic system fail then cylinder 770 will, through its own force, actuate the linkage mechanism for mechanical non-power assisted steering. The entire steering is effected when the front carriage starts to steer about the fifth wheel 101.

From the foregoing it can be seen there is phased power steering for a train type multi-wheel multi-axle unit. It is also seen there is provided detachably mounted goosenecks on either a load carrying bed or the load itself.

As for the system illustrated in the FIGS. 7, 8 and 9, there are three effective front haul units, each unit being tied together by the four point bed designated generally by the reference numeral 600. For connecting there is a standard fifth wheel utilized with side tilt and normally the lead tractor would be used to control the steering. At the fifth wheel of the lead tractor there is an electronic sensor telling the other drive units to turn the required angle to stay in phase with the lead tractor. The rear module automatically stays in phase with the lead tractor in a manner as described in the foregoing with respect to FIG. 12.

We claim:

1. A load hauler for travelling on conventional road ways to move, for example heavy construction equipment such as cranes or the like from one work site to another, said hauler comprising:
   (A) a front carriage comprising a rigid frame supported upon a multiplicity of hydraulically suspended, independent wheel and axle units, said wheel and axle units being spaced apart from one another longitudinally along and laterally across said frame; a first fifth wheel coupling at the leading end of such front carriage for connecting to the fifth wheel coupling of a tow vehicle, and a second fifth wheel coupling on said frame at a position spaced rearwardly from said first fifth wheel coupling;
   (B) a rear carriage comprising a rigid frame supported upon a multiplicity of hydraulically suspended, independent wheel and axle units spaced apart from one another longitudinally along and laterally across said frame, said rear carriage having a third fifth wheel type or similar coupling thereon intermediate the leading and trailing end thereof;
   (C) a load unit having detachably connected thereto a forwardly projecting and a rearwardly projecting pair of goosenecks, each of said goosenecks having a fifth wheel coupling with the one on the forwardly projecting gooseneck connected to the said second fifth wheel coupling on the front carriage and the other to said third fifth wheel type coupling on said rear carriage;

(D) valved hydraulic circuit means interconnecting the hydraulic suspensions of said wheel and axle units selectively to distribute the load equally amongst all of the wheel units and control stiffness of roll of the load about on axis lengthwise of the hauler;

(E) gas charged accumulator means associated with the hydraulic suspensions providing a spring suspension system; and wherein at least some of the independent wheel and axle units are steerably mounted on the carriage associated therewith.

2. A load hauler as defined in claim 1 wherein said valved hydraulic circuit means is operative selectively to adjust the height and level of the load.

3. A load hauler for travelling on conventional road ways to move, for example heavy construction equipment such as cranes or the like from one work site to another, said hauler comprising:

(A) a front carriage comprising a rigid frame supported upon a multiplicity of hydraulically suspended, independent wheel and axle units, said wheel and axle units being spaced apart from one another longitudinally along and laterally across said frame; a first fifth wheel coupling at the leading end of such front carriage for connecting to the fifth wheel coupling of a tow vehicle, and a second fifth wheel coupling on said frame at a position spaced rearwardly from said first fifth wheel coupling;

(B) a rear carriage comprising a rigid frame supported upon a multiplicity of hydraulically suspended, independent wheel and axle units spaced apart from one another longitudinally along and laterally across said frame, said rear carriage having a third fifth wheel type or similar coupling thereon intermediate the leading and trailing end thereof;

(C) a load unit having detachably connected thereto a forwardly projecting and a rearwardly projecting pair of goosenecks, each of said goosenecks having a fifth wheel coupling with the one on the forwardly projecting gooseneck connected to the said second fifth wheel coupling on the front carriage and the other to said third fifth wheel coupling on said rear carriage;

(D) valved hydraulic circuit means interconnecting the hydraulic suspensions of said wheel and axle units selectively to distribute the load equally amongst all of the wheel units and control stiffness of roll of the load about on axis lengthwise of the hauler;

(E) gas charged accumulator means associated with the hydraulic suspensions providing a spring suspension system; and wherein each of said front and rear load carrying carriages have some of the independent wheel and axle units thereon steerable and including hydraulic control circuit means interphasing the steering of the front and rear carriages and means actuating said hydraulic control circuit means in response to pivotal movement at the respective first and second fifth wheel couplings.

4. A load hauler as defined in claim 1 including linkage means detachably connected to said rear carriage and gooseneck associated therewith selectively preventing pivotal movement about the vertical pivot axis of said fifth wheel.

5. A load hauler for travelling on conventional road ways to move, for example heavy construction equipment such as cranes or the like from one work site to another, said hauler comprising:

(A) a front carriage supported upon a multiplicity of independent wheel and axle units; a first fifth wheel coupling at the leading end of such front carriage for connecting to the fifth wheel coupling of a tow vehicle and a second fifth wheel coupling spaced rearwardly therefrom on such front carriage;

(B) a rear carriage supported upon a multiplicity of independent wheel and axle units, said rear carriage having a third fifth wheel type or the like coupling thereon intermediate the leading and trailing end thereof; and (C) a load unit having detachably connected thereto a forwardly projecting and a rearwardly projecting pair of goosenecks, each of said goosenecks having a fifth wheel coupling with the one on the forwardly projecting gooseneck connected to the said second fifth wheel coupling on the front carriage and the other to said third fifth wheel coupling on the rear carriage; said load unit comprising a work crane to be moved from one location to another and wherein one gooseneck is detachably connected to the base of the crane and the other gooseneck is connected to the platform of the crane rotatably mounted on the base.

6. A load hauler for travelling on conventional road ways to move, for example heavy construction equipment such an cranes or the like from one work site to another, said hauler comprising:

(A) a front carriage supported upon a multiplicity of independent wheel and axle units, a first fifth wheel coupling at the leading and of such front carriage for connecting to the fifth wheel coupling of a tractor tow vehicle and a second fifth wheel coupling spaced rearwardly therefrom on such front carriage;

(B) a rear carriage supported upon a multiplicity of independent wheel and axle units, said rear carriage having a third fifth wheel type or the like coupling thereon intermediate the leading and trailing end thereof;

(C) a load unit having detachably connected thereto a forwardly projecting and a rearwardly projecting pair of goosenecks, each of said goosenecks having a fifth wheel coupling with the one on the forwardly projecting gooseneck connected to the said second fifth wheel coupling on the front carriage and the other to said third fifth wheel coupling on the rear carriage, each of said front and rear carriages having some of the independent wheel and axle units thereon steerable;

(D) hydraulic power units and control circuit means interphasing and power assisting the steering of the front and rear carriages including means controlled by pivotal movement of the respective first and second fifth wheel couplings actuating said control circuit means, said hydraulic control circuit means interphasing steering of the front and rear carriages including a first valve-hydraulic cylinder in-line unit anchored respectively to the frame of the front carriage and load unit so as to be actuated by relative pivotal movement about said second fifth wheel and a second valve-hydraulic cylinder in-line unit anchored at one end to the frame of said rear carriage and at the other end to a linkage mechanism steerably connected to steerable wheel units on said rear carriage; and (E) lock means selectively preventing pivotal relational movement of said rear carriage and gooseneck at said third fifth wheel.

7. A load hauler for travelling on conventional road ways to move, for example heavy construction equipment such as cranes or the like from one work site to another, said hauler comprising:

(A) a front carriage comprising a rigid frame supported upon a multiplicity of independent, hydraulically suspended, wheel and axle units; a first fifth wheel coupling at the leading end of such front carriage for connecting to the fifth wheel coupling of a tow vehicle and a second fifth wheel coupling mounted on said frame at a position spaced rearwardly from said first fifth wheel coupling;

(B) a rear carriage comprising a rigid frame supported upon a multiplicity of independent, hydraulically suspended, wheel and axle units, said rear carriage having a third fifth wheel type or similar coupling thereon intermediate the leading and trailing and thereof;

(C) a load unit having detachably connected thereto a forwardly projecting and a rearwardly projecting pair of goosenecks, each of said goosenecks having a fifth wheel coupling with the one on the forwardly projecting gooseneck connected to the said second fifth wheel coupling on said front carriage and the other to said third fifth wheel coupling on said rear carriage, each said gooseneck being adjustably attached to said load unit including being pivotally connected to said load unit for limited pivotal movement about an axis transverse to the length of the hauler and an adjustable variable length support interposed between the gooseneck and load unit at a position spaced from said pivot axis to selectively vary the downward tilt load carrying position of the gooseneck relative to the load unit.

8. A load hauler as defined in claim 6 including power assist cylinders connected to the linkage means of said steerable wheels and wherein said hydraulic power cylinders of the rear carriage are actuated by the valve of said second valve-hydraulic-cylinder in-line unit.

9. A load hauler for travelling on conventional road ways to move, for example heavy construction equipment such as cranes or the like from one work site to another, said hauler comprising:

(A) a front carriage comprising a rigid frame supported upon a multiplicity of hydraulically suspended, independent wheel and axle units, said wheel and axle units being spaced apart from one another longitudinally along and laterally across said frame; a first fifth wheel coupling at the leading of such front carriage for connecting to the fifth wheel coupling of a tow vehicle, and a second fifth wheel coupling on said frame at a position spaced rearwardly from said first fifth wheel coupling;

(B) a rear carriage comprising a rigid frame supported upon a multiplicity of hydraulically suspended, independent wheel and axle units spaced apart from one another longitudinally along and laterally across said frame, said rear carriage having a third fifth wheel type or similar coupling thereon intermediate the leading and trailing end thereof;

(C) a load unit having detachably connected thereto a forwardly projecting and a rearwardly projecting pair of goosenecks, each of said goosenecks having a fifth wheel coupling with the one on the forwardly projecting gooseneck connected to the said second fifth wheel coupling on the front carriage and the other to said third fifth wheel coupling on said rear carriage;

(D) valved hydraulic circuit means interconnecting the hydraulic suspensions of said wheel and axle units selectively to distribute the load equally amongst all of the wheel units and control stiffness of roll of the load about on axis lengthwise of the hauler;

(E) gas charged accumulator means associated with the hydraulic suspensions providing a spring suspension system; and wherein said goosenecks are adjustably connected to said load unit to selectively vary the downward tilt load carrying position of the gooseneck relative to the load unit, the adjustable connection for each gooseneck including a pivotal means for limited pivotal movement about an axis transverse to the length of the hauler and an adjustable variable length support interposed between said load unit and gooseneck at a position spaced from said pivot axis longitudinally of the hauler.

10. A load hauler for travelling on conventional road ways to move, for example heavy construction equipment such as cranes or the like from one work site to another, said hauler comprising:

(A) a front carriage comprising a first rigid frame supported upon a multiplicity of hydraulically suspended independent wheel and axle units, said wheel and axle units being spaced apart from one another longitudinally along and laterally across said first rigid frame; a first fifth wheel coupling at the leading end of such front carriage for connecting to the fifth wheel coupling of a tow vehicle and a second fifth wheel coupling on said frame and located at a position spaced rearwardly from said first fifth wheel coupling on such front carriage;

(B) a rear carriage comprising a second rigid frame supported upon a multiplicity of hydraulically suspended independent wheel and axle units, said wheel and axle units being spaced apart longitudinally along and laterally across said second rigid frame, said rear carriage having a third fifth wheel type or the like coupling thereon intermediate the leading and trailing end thereof;

(C) a load unit having detachably connected thereto a forwardly projecting and a rearwardly projecting pair of goosenecks, each of said goosenecks having a fifth wheel coupling with the one on the forwardly projecting gooseneck connected to the said second fifth wheel coupling on the front carriage and the other to said third fifth wheel coupling on the rear carriage;

(D) valved hydraulic circuit means interconnecting the hydraulic suspension means and selectively operative hydraulically inter-relating the suspension longitudinally of the hauler and being independent side to side, at least some of said independent wheel and axle units on each of said front and rear carriages being steerably mounted;

(E) power assisted mechanical first and second linkage means, respectively on said front and rear carriages and connected to the steerable wheels associated with such respective carriage;

(F) a hydraulic cylinder unit associated with such respective carriages and circuit means connecting the same interphasing steering of the steerable wheels on said front and rear carriages; and (G) gas charged accumulator means associated with the hydraulic suspension providing a spring suspension system.

11. A load hauler as defined in claim 10 including fluid flow hydraulic circuit control means controlling stiffness of roll of the load about an axis length-wise of the hauler.

12. A load hauler as defined in claim 10 wherein said means interphasing steering of the steerable wheels of the front and rear carriages includes a first valve hydraulic-cylinder in-line unit anchored respectively to the frame of the front carriage and said load unit so as to be actuated by relative pivotal movement about said second fifth wheel and a second valve hydraulic-cylinder in-line unit anchored at one end to the frame of said rear carriage and at the other and to the linkage means steerably connected to the steerable wheel units on said rear carriage.

13. A load hauler as defined in claim 12 including power assist cylinders connected to the linkage means of said steerable wheels and wherein said hydraulic power assist cylinders are actuated by the valve of said second valve hydraulic-cylinder units.

* * * * *